United States Patent
Uberti et al.

(10) Patent No.: US 10,739,164 B2
(45) Date of Patent: Aug. 11, 2020

(54) CIRCUIT FOR DETECTING MOTION OF AN OBJECT

(71) Applicant: Allegro MicroSystems, LLC, Worcester, MA (US)

(72) Inventors: Bruno Luis Uberti, Ciudad Autonoma de Buenos Aires (AR); Manuel Rivas, Buenos Aires (AR)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 15/418,114

(22) Filed: Jan. 27, 2017

(65) Prior Publication Data

US 2018/0216963 A1 Aug. 2, 2018

(51) Int. Cl.
*G01D 5/14* (2006.01)

(52) U.S. Cl.
CPC .................................. *G01D 5/145* (2013.01)

(58) Field of Classification Search
CPC .. B60Q 1/1446; B60Q 1/1453; B60Q 1/1461; B60Q 1/1469; B60Q 1/1476; G01B 7/30; G01B 7/003; G01D 5/14; G01D 5/142; G01D 5/16; G05G 2009/04748; G05G 2009/04751; G05G 2009/04755; G05G 2009/0477
USPC ........ 200/4; 315/77, 82; 324/207.11–207.14, 324/207.2–207.26; 362/465
See application file for complete search history.

(56) References Cited

U.S. PATENT DOCUMENTS

| | | | |
|---|---|---|---|
| 4,668,914 A | 5/1987 | Kersten et al. | |
| 4,761,569 A | 8/1988 | Higgs | |
| 4,829,352 A | 5/1989 | Popovic et al. | |
| 5,073,858 A | 12/1991 | Mills | |
| 5,388,307 A * | 2/1995 | Hyde | G05G 1/12 16/441 |
| 5,541,506 A | 7/1996 | Kawakita et al. | |
| 5,572,058 A | 11/1996 | Biard | |
| 5,612,618 A | 3/1997 | Arakawa | |
| 5,619,137 A | 4/1997 | Vig et al. | |

(Continued)

FOREIGN PATENT DOCUMENTS

| | | |
|---|---|---|
| DE | 102006037226 | 2/2008 |
| EP | 0631416 | 12/1994 |

(Continued)

OTHER PUBLICATIONS

U.S. Appl. No. 15/012,142, filed Feb. 1, 2016, Alpago et al.
(Continued)

*Primary Examiner* — Steven L Yeninas
(74) *Attorney, Agent, or Firm* — Daly, Crowley, Mofford & Durkee, LLP

(57) ABSTRACT

A circuit for detecting motion of an object includes a semiconductor substrate having first and second opposing surfaces. The circuit also includes a magnetic field sensor disposed on the first surface of the substrate and configured to generate a respective plurality of magnetic field sensor output signals in response to a magnetic field associated with the object. At least one of the magnetic field sensor output signals is indicative of an angular position of the magnetic field with respect to the sensor. Additionally, at least one of the magnetic field sensor output signals is indicative of an amplitude of the magnetic field.

27 Claims, 7 Drawing Sheets

(56) References Cited

U.S. PATENT DOCUMENTS

| | | |
|---|---|---|
| 5,621,319 A | 4/1997 | Bilotti et al. |
| 5,646,527 A | 7/1997 | Mani et al. |
| 5,657,189 A | 8/1997 | Sandhu |
| 5,689,236 A | 11/1997 | Kister |
| 5,694,038 A | 12/1997 | Moody et al. |
| 5,831,513 A | 11/1998 | Lue |
| 5,844,411 A | 12/1998 | Vogt |
| 5,942,895 A | 8/1999 | Popovic et al. |
| 6,064,199 A | 5/2000 | Walter et al. |
| 6,064,202 A | 5/2000 | Steiner et al. |
| 6,091,239 A | 7/2000 | Vig et al. |
| 6,100,680 A | 8/2000 | Vig et al. |
| 6,166,535 A | 12/2000 | Irle et al. |
| 6,232,768 B1 | 5/2001 | Moody et al. |
| 6,236,199 B1 | 5/2001 | Irle et al. |
| 6,265,864 B1 | 7/2001 | De Winter et al. |
| 6,278,271 B1 | 8/2001 | Schott |
| 6,288,633 B1 | 9/2001 | Volpe et al. |
| 6,297,627 B1 | 10/2001 | Towne et al. |
| 6,356,741 B1 | 3/2002 | Bilotti et al. |
| 6,525,531 B2 | 2/2003 | Forrest et al. |
| 6,542,068 B1 | 4/2003 | Drapp et al. |
| 6,545,462 B2 | 4/2003 | Schott et al. |
| 6,622,012 B2 | 9/2003 | Bilotti et al. |
| 6,659,630 B2 * | 12/2003 | Becker .............. B60Q 1/1461 335/205 |
| 6,768,301 B1 | 7/2004 | Hohe et al. |
| 6,927,348 B1 * | 8/2005 | Schmidt .............. H01H 19/11 200/336 |
| 6,969,988 B2 | 11/2005 | Kakuta et al. |
| 7,030,606 B2 | 4/2006 | Kato et al. |
| 7,038,448 B2 | 5/2006 | Schott et al. |
| 7,085,119 B2 | 8/2006 | Bilotti et al. |
| 7,119,538 B2 | 10/2006 | Blossfeld |
| 7,159,556 B2 | 1/2007 | Yoshihara |
| 7,235,968 B2 | 6/2007 | Popovic et al. |
| 7,259,556 B2 | 8/2007 | Popovic et al. |
| 7,307,824 B2 | 12/2007 | Bilotti et al. |
| 7,362,094 B2 | 4/2008 | Voisine et al. |
| 7,714,570 B2 | 5/2010 | Thomas et al. |
| 7,746,065 B2 | 6/2010 | Pastre et al. |
| 7,759,929 B2 | 7/2010 | Forsyth |
| 7,872,322 B2 | 1/2011 | Schott et al. |
| 7,911,203 B2 | 3/2011 | Thomas et al. |
| 7,965,076 B2 | 6/2011 | Schott |
| 7,994,774 B2 | 8/2011 | Thomas et al. |
| 8,922,206 B2 | 12/2014 | Friedrich et al. |
| 9,062,990 B2 | 6/2015 | Petrie |
| 9,099,638 B2 | 8/2015 | Wang et al. |
| 9,411,023 B2 | 8/2016 | Friedrich et al. |
| 10,267,653 B2 * | 4/2019 | Ferri .................. G04C 3/004 |
| 2003/0001705 A1 | 1/2003 | Sugiyama .......... B60Q 1/1469 335/205 |
| 2004/0195080 A1 * | 10/2004 | Hagberg .............. B60Q 1/0076 200/4 |
| 2005/0030012 A1 * | 2/2005 | Kunz-Vizenetz ...... G01D 5/145 324/207.25 |
| 2006/0011999 A1 | 1/2006 | Schott et al. |
| 2006/0097715 A1 | 5/2006 | Oohira et al. |
| 2007/0029998 A1 | 2/2007 | Popovic et al. |
| 2008/0265877 A1 * | 10/2008 | Kato .................. G01D 5/245 324/207.25 |
| 2009/0058411 A1 | 3/2009 | Miyoshi et al. |
| 2009/0058412 A1 | 3/2009 | Taylor et al. |
| 2009/0121707 A1 | 5/2009 | Schott |
| 2009/0174395 A1 | 7/2009 | Thomas et al. |
| 2010/0156397 A1 | 6/2010 | Yabusaki et al. |
| 2010/0164491 A1 | 7/2010 | Kejik et al. |
| 2010/0181171 A1 * | 7/2010 | Kawachi .............. B60Q 1/1476 200/16 R |
| 2010/0207222 A1 | 8/2010 | Wang |
| 2011/0031960 A1 | 2/2011 | Hohe et al. |
| 2011/0248708 A1 | 10/2011 | Thomas et al. |
| 2014/0225598 A1 * | 8/2014 | Romero .............. G01R 33/075 324/207.12 |
| 2014/0347044 A1 | 11/2014 | Monreal et al. |
| 2015/0168178 A1 * | 6/2015 | Hoover .............. G01D 5/245 368/321 |
| 2015/0354985 A1 * | 12/2015 | Judkins, III .......... G01D 5/142 324/207.14 |
| 2016/0123769 A1 * | 5/2016 | Nishimoto .......... G01D 5/145 324/207.23 |
| 2017/0241805 A1 * | 8/2017 | Ferri .................. G01S 5/0081 |

FOREIGN PATENT DOCUMENTS

| | | |
|---|---|---|
| EP | 0875733 | 11/1998 |
| EP | 0947846 | 10/1999 |
| EP | 2000813 | 12/2008 |
| EP | 2000814 | 12/2008 |
| EP | 2000816 | 12/2008 |
| JP | S 5855688 | 4/1983 |
| JP | 2003-042709 | 2/2003 |
| JP | 2005-241269 | 9/2005 |
| JP | 2010-014607 | 1/2010 |
| JP | 2010-078366 | 4/2010 |
| WO | WO 98/10302 | 3/1998 |
| WO | WO 98/54547 | 12/1998 |
| WO | WO 00/02266 A1 | 1/2000 |
| WO | WO 01/18556 | 3/2001 |
| WO | WO 03/036732 | 5/2003 |
| WO | WO 2004/025742 | 3/2004 |
| WO | WO 2006/056289 | 6/2006 |
| WO | WO 2006/074989 | 7/2006 |
| WO | WO 2008/145662 | 12/2008 |
| WO | WO 2009/030361 | 3/2009 |
| WO | WO 2009/124969 | 10/2009 |

OTHER PUBLICATIONS

Roumenin et al.; "Vertical Hall Effect Devices in the Basis of Smart Silicon Sensors;" IEEE Workshop on Intelligent Data Acquisition and Advanced Computing Systems: Technology and Applications; Sep. 5-7, 2005; 4 pages.

Allegro Microsystems, Inc.; "A1351 Data Sheet: High Precision Linear Hall Effect Sensor with a Push/Pull, Pulse Width Modulated Output;" published Mar. 7, 2008; 23 pages.

Allegro Microsystems, Inc., "High Precision 2-Wire Linear Hall Effect Sensor IC with a Pulse Width Modulated Output;" A1354; 22 pages.

Allegro Microsystems, Inc.; "High Precision Linear Hall-Effect Sensor with an Open Drain Pulse Width Modulated Output;" A1356; 20 pages.

Allegro Microsystems, Inc.; "A1360, A1361 and A1362 Data Sheet: Low-Noise Programmable Linear Hall Effect Sensors with Adjustable Bandwidth (50 kHz Maximum) and Analog Output;" published Mar. 18, 2008; 25 pages.

Baschirotto et al. "Development and Analysis of a PCB Vector 2-D Magnetic Field Sensor System for Electronic Compasses;" IEEE Sensors Journal, vol. 6, No. 2; Apr. 2006; 7 pages.

Kejik, P. et al.; "Purley CMOS Angular Position Sensor Based on a New Hall Microchip;" 34$^{th}$ Annual Conference of IEEE Industrial Electronics; IECON; Nov. 10-13, 2008; 5 pages.

Kejik, P.et al.; "Ultra Low-Power Angular Position Sensor for High-Speed Portable Applications;" 2009 IEEE Sensors Conference; Oct. 25-28, 2009; 4 pages.

Reymond, S. et al.; "True 2D CMOS Integrated Hall Sensor," 2007 IEEE Sensors Conference; Oct. 28-31, 2007; 4 pages.

Gerhauser, H., "Intelligente 3D-Magnetfeld Snesorik;" Fraunhofer-Institut for Integrierte Schaltungen IIS; www.iis.fraunhofer.de/asic/analog; Oct. 2009; 2 pages.

Melexis Microelectronic Integrated Systems; MLX90333; "Triaxis 3D-Joystick Position Sensor;" Data Sheet; Mar. 2009; 43 pages.

Memsic Corporation; AN-00MM-004; "Electronic Tilt Compensation;" Mar. 2008; 5 pages.

Memsic Corporation; AN-00MM-003; "Magnetic Sensor Calibration;" Mar. 2008; 5 pages.

(56) References Cited

OTHER PUBLICATIONS

Memsic Corporation; AN-00MM-002; "Magnetometer Soldering Methodology;" Jun. 2008; 2 pages.
Memsic Corporation; AN-00MM-001; "Magnetometer Fundamentals;" Jun. 2008; 6 pages.
Memsic Corporation; AN-00MM-005; "Magnetic Sensor Placement Guidelines;" Oct. 2008; 2 pages.
Memsic Corporation; MMC312xMQ; "Tri-axis Magnetic Sensor, with I²C Interface;" Aug. 14, 2008; 9 pages.
Memsic Corporation; MMC314xMQ; "Ultra Small 3-axis Magnetic Sensor, with I²C Interface;" Mar. 31, 2010; 8 pages.
Micronas GmbH; "HAL® 3625 Programmable Direct Angle Sensor;" Product Information; Sep. 2009; 2 pages.
Allegro Microsystems, Inc.; "A1140/41/42/43 Data Sheet: Sensitive Two-Wire Chopper-Stabilized Unipolar Hall-Effect Switches;" published Sep. 9, 2004; 10 pages.
Allegro Microsystems, Inc.; "A1174 Data Sheet: Ultrasensitive Hall Effect Latch with Internally or Externally Controlled Sample and Sleep Periods for Track Ball and Scroll Wheel Applications;" published Jul. 25, 2008; 13 pages.
Allegro Microsystems, Inc.; "A1230 Data Sheet: Ultra-Sensitive Dual-Channel Quadrature Hall-Effect Bipolar Switch;" published Mar. 26, 2010; 16 pages.
Allegro Microsystems, Inc.; "A3212 Data Sheet: Micropower, Ultra-Sensitive Hall-Effect Switch;" published Sep. 22, 2004; 12 pages.
Allegro Microsystems, Inc.; "ATS675LSE Data Sheet: Self-Calibrating TPOS Speed Sensor Optimized for Automotive Cam Sensing Applications;" published Jul. 11, 2008; 13 pages.
Allegro Microsystems, Inc.; "27701-AN Data Sheet: Hall-Effect IC Applications Guide;" Application Information, Rev. 2; http://www.allegromicro.com/en/products/design/hall-effect-sensor-ic-applications-guide/AN27701.pdf; downloaded Sep. 29, 2010; 40 pages.
Allegro Microsystems, Inc.; "3235 Data Sheet 27633A, Dual-Output Hall-Effect Switch;" http://www.datasheetcatalog.org/datasheets/90/205047_DS.pdf; downloaded Sep. 29, 2010; 6 pages.
Allegro Microsystems, Inc.; "A3425 Data Sheet: Dual, Chopper-Stabilized, Ultra-Sensitive Bipolar Hall-Effect Switch;" published Jun. 28, 2002; 10 pages.
Atherton et al.; "Sensor Signal Conditioning—an IC Designer's Perspective;" IEEE Electro International; Apr. 26-28, 1991; 6 pages.
Austria Microsystems; "AS5040 datasheet; 10-Bit Programmable Magnetic Rotary Encoder;" Revision 1.1; Jan. 2004; 20 pages.
Banjevic et al; "2D CMOS Integrated Magnetometer Based on the Miniaturized Circular Vertical Hall Device;" International Solid-State Sensors, Actuators and Microsystems Conference; Transducers; Jun. 21-25, 2009; pp. 4 pages.
Blanchard et al.; "Cylindrical Hall Device;" International Electron Devices Meeting; Dec. 8-11, 1996; 4 pages.
Burger et al.; "New fully integrated 3-D silicon Hall sensor for precise angular-position measurements;" Sensors and Actuators, A 67; May 1998; 5 pages.
Dwyer; "Allegro Microsystems, Inc.; AN296061 Data Sheet: Ring Magnet Speed Sensing for Electronic Power Steering;" published Jul. 21, 2009; 4 pages.
Freitas et al.; "Giant magnetoresistive sensors for rotational speed control;" Jorunal of Applied Physics, vol. 85, No. 8; Apr. 15, 1999; 3 pages.
Gilbert; "Technical Advances in Hall-Effect Sensing;" Allegro Microsystems, Inc. Product Description; May 10, 2008; 7 pages.
Häberli et al.; "Contactless Angle Measurements by CMOS Magnetic Sensor with on Chip Read-Out Circuit;" The 8$^{th}$ International Conference on Solid-State Sensors and Actuators and Eurosensors IX; Jan. 25-29, 1995; 4 pages.
Häberli et al.; "Two-Dimensional Magnetic Microsensor with On-Chip Signal Processing for Contactless Angle Measurement;" IEEE Journal of Solid-State Circuits, vol. 31, No. 12; Dec. 1996; 6 pages.
Hiligsmann et al.; "Monolithic 360 Degrees Rotary Position Sensor IC;" 2004 IEEE Proceedings of Sensors, vol. 3; Oct. 24-27, 2004; 6 pages.
Kejik et al.; "Circular Hall Transducer for Angular Position Sensing;" International Solid-State Sensors, Actuators and Microsystems Conference; Transducers; Jun. 2007; 4 pages.
Lou Law; "Angular Position Sensing with 2-Axis Hall ICs;" Sensors Magazine, vol. 20, No. 3; Feb. 12, 2014; 7 pages.
Metz et al.; "Contactless Angle Measurement Using Four Hall Devices on Single Chip;"; International Conference on Solid State Sensors and Actuators; Transducers; vol. 1; Jun. 16-19, 1997; 4 pages.
Munter; "A Low-offset Spinning-current Hall Plate;" Sensors and Actuators, vol. A21-A23; Jan. 1990; 4 pages.
Novotechnik Siedle Group; "How New Angular Positioning Sensor Technology Opens a Broad Range of New Applications;" Vert-X Technology; Dec. 2001; 5 pages.
Paranjape et al.; "A CMOS-compatible 2-D vertical Hall magnetic-field sensor using active carrier confinement and post-process micromachining;" The 8$^{th}$ International Conference on Solid-State Sensors and Acutators, Physical vol. 53, Issues 1-3; May 1996; 6 pages.
Petoussis et al.; "A Novel Hall Effect Sensor Using Elaborate Offset Cancellation Method;" Sensors & Transducers Journal, vol. 100, Issue 1; Jan. 2009; 7 pages.
Popovic; "Not-plate-like Hall magnetic sensors and their applications;" Sensors and Actuators A: Physical, vol. 85, Issues 1-3; Aug. 2000; 9 pages.
Roumenin; "Magnetic sensors continue to advance towards perfection;" Sensors and Actuators A: Physical, vol. 46-47, Issues 1-3; Jan.-Feb. 1995; 7 pages.
Schneider et al.; "Temperature Calibration of CMOS Magnetic Vector Probe for Contactless Angle Measurement System;" International Electron Devices Meeting; Dec. 8-11, 1996; 4 pages.
Van der Meer; et al; "CMOS quad spinning-current Hall-sensor system for compass application;" IEEE Proceedings of Sensors, vol. 3; Oct. 24-27, 2004; 4 pages.
Vogelgesang et al.; Robert Bosch GmbH; "GMR sensors in automotive application;" CS-SNS/ECS Slides Presentation; Mar. 2, 2005; 16 pages.
Volder; "The CORDIC Trigonometric Computing Technique;" The Institute of Radio Engineers, Inc.; IRE Transactions on Electronic Computers, vol. EC, Issue 3; Sep. 1959; 5 pages.
Drljaca, et al.; "Nonlinear Effects in Magnetic Angular Position Sensor With Integrated Flux Concentrator;" Proc. 23$^{rd}$ International Conference on Microelectronics (MIEL 2002); vol. 1; NIS; Yugoslavia; May 12-15, 2002; 4 pages.
Melexis MLX 90324; ""Under-the-Hood" Triaxis Rotary Position feat. SENT Protocol;" 3901090324 Data Sheet; Dec. 2008; 40 pages.
Banjevic; "High Bandwidth CMOS Magnetic Sensors Based on the Miniaturized Circular Vertical Hall Device;" Sep. 2011; 153 pages.
Taiwan Office Action with English translation dated Aug. 1, 2014 for Taiwan Pat. App. No. 101129714; 20 pages.
PCT Search Report and Written Opinion of the ISA; dated May 3, 2013 for PCT Pat. App. No. 2012-050074; 25 pages.
PCT International Preliminary Report on Patentability and Written Opinion of the ISA dated Mar. 20, 2014 for PCT Pat. App. No. PCT/US2012/050074; 17 pages.
Response to European Official Communication filed Sep. 5, 2014 for European Pat. App. No. 12758680.8; 27 pages.
Response Taiwan Office Action with English claims filed Nov. 5, 2014 for Taiwanese Pat. App. No. 101129714 13 pages.
Masson et al.; "Multiturn and high precision through-shaft magnetic sensors;" Sensor + Text Conference; Proceedings II; May 2009; 6 pages.
SENSIMA technology sa; "CVHD: a new concept of Angular Position Sensor;" Slide Presentation for Allegro Microsystems; Mar. 2009; 17 pages.
Restriction Requirement dated Jul. 5, 2013; for U.S. Appl. No. 13/226,694; 5 pages.
Response to Restriction Requirement filed Jul. 17, 2013 for U.S. Appl. No. 13/226,694; 1 page.
Office Action dated Apr. 11, 2014; for U.S. Appl. No. 13/226,694 11 pages.

(56) References Cited

OTHER PUBLICATIONS

Response filed Jul. 2, 2014; to Office Action dated Apr. 11, 2014 for U.S. Appl. No. 13/226,694; 13 pages.
Notice of Allowance dated Aug. 29, 2014 for U.S. Appl. No. 13/226,694 8 pages.
European Office Action dated Aug. 12, 2015 for European Application No. 12758680.8; 6 pages.
Response to European Office Action filed Dec. 10, 2015 for European Application No. 12758680.8; 6 pages.
PCT Invitation to Pay Additional Fees with Partial Search Report; dated Feb. 4, 2013; for PCT Pat. App. No. PCT/US2012/050074; 10 pages.
Japanese Office Action with English translation dated Mar. 10, 2016 for Japanese Application No. 2014-529722; 7 pages.
Response to Japanese Office Action with English claims filed May 25, 2016 for Japanese Application No. 2014-529722; 16 pages.
Notice of Allowance with English allowed claims dated Nov. 16, 2016 for Japanese Application No. 2014-529722; 10 pages.
Office Action dated Jun. 16, 2015 for U.S. Appl. No. 14/550,202; 8 pages.
Response to Office Action filed on Sep. 11, 2015 for U.S. Appl. No. 14/550,202; 10 pages.
Office Action dated Oct. 20, 2015 for U.S. Appl. No. 14/550,202; 8 pages.
Response to Office Action filed on Jan. 19, 2016 for U.S. Appl. No. 14/550,202; 11 pages.
Final Office Action dated Feb. 25, 2016 2016 for U.S. Appl. No. 14/550,202; 17 pages.
Response to Office Action filed Apr. 28, 2016 for U.S. Appl. No. 14/550,202; 11 pages.
Notice of Allowance dated May 25, 2016 for U.S. Appl. No. 14/550,202; 5 pages.
Taiwan Office Action with English translation dated Sep. 9, 2015, for Taiwanese Pat. App. No. 103138342; 11 pages.
Response to Taiwan Office Action with English translation filed on Dec. 8, 2015 for Taiwanese Pat. App. No. 103138342; 14 pages.
DCMD Instruction Letter dated Apr. 22, 2019 for KR Pat. Appl. No. 10-2014-7005891; 2 pages.
$21^{st}$ Century Letter dated Apr. 18, 2019 for KR Pat. Appl. No. 10-2014-7005891; 3 pages.
Notice to Submit a Response dated Mar. 27, 2019 for KR Pat. Appl. No. 10-2014-7005891; 3 pages.
Listing of Pending Claims received on Apr. 18, 2019 for KR Pat. Appl. No. 10-2014-7005891; 10 pages.
Notice of Allowance with English allowed claims dated Aug. 16, 2019 for Korean Application No. 10-2014-7005891; 15 pages.
Korean Certificate of Grant dated Aug. 27, 2019 for Korean Application No. 10-2014-7005891; 28 pages.

\* cited by examiner

CIRCUIT FOR DETECTING MOTION OF AN OBJECT

CROSS REFERENCE TO RELATED APPLICATIONS

Not Applicable.

STATEMENT REGARDING FEDERALLY SPONSORED RESEARCH

Not Applicable.

FIELD

This disclosure relates generally to circuits and, more particularly, to a circuit for detecting motion of an object.

BACKGROUND

As is known, magnetic field sensors are used in a variety of applications. In motion (e.g., rotation) detector circuits, for example, a magnetic field sensor may be used to detect motion of an object, such as a gear or ring magnet. A magnetic field affected by motion of the object may be sensed by the magnetic field sensor. In response to the sensed magnetic field, the magnetic field sensor may provide respective signals (e.g., magnetic field sensor output signals) proportional to the sensed magnetic field. Such signals can be processed to detect motion of the object.

SUMMARY

Described herein are concepts, systems, circuits and techniques related to a circuit (e.g., an angle and amplitude encoder) for detecting motion of an object. In one aspect of the concepts described herein, a circuit for detecting motion of an object includes a semiconductor substrate having a magnetic field sensor disposed on a first surface thereof and configured to generate one or more magnetic field sensor output signals in response to a magnetic field associated with the object with at least one of the sensor output signals being indicative of an angular position of the magnetic field with respect to the sensor. Additionally, at least one of the sensor output signals is indicative of an amplitude of the magnetic field.

The circuit may include one or more of the following features individually or in combination with other features. The amplitude of the magnetic field associated with the object may be related to a spacing (e.g. an air gap distance) between the object and a reference surface of the sensor. The circuit may include circuitry coupled to receive the sensor output signal indicative of the angular position of the magnetic field. The circuitry may be configured to provide an output signal of the magnetic field sensor indicative of an angular position of the object with respect to a reference plane on the reference surface of the sensor. The angular position of the object may correspond to one of N possible discrete angular positions of the object. Each of the N discrete angular positions may correspond to one of a plurality of encoded spatial regions.

In response to a first magnetic field sensed at a first spacing between the object and the reference surface of the sensor, the magnetic field sensor may provide a first output signal. In response to a second magnetic field sensed at a second, different spacing between the object and the reference surface of the sensor, the sensor may provide a second, different output signal. The first and second spacings may be two of a plurality of possible spacings between the object and the reference surface of the sensor. Each of the plurality of possible spacings may correspond to one of a plurality of encoded spatial regions. The output signal of the magnetic field sensor may be an encoded output signal.

The magnetic field sensor may include a plurality of magnetic field sensing elements. The plurality of sensing elements may include two magnetic field sensing elements having axes of maximum sensitivity which are orthogonal with respect to each other. The object may be comprised of a magnetic material. The magnetic field associated with the object may be generated by the object. The object may be coupled to a magnet. The magnetic field associated with the object may be generated by a magnet. The magnetic field associated with the object may be affected by motion of the object. The plurality of sensing elements may include one or more vertical Hall effect elements. The plurality of sensing elements may include one or more of an anisotropic magnetoresistance (AMR) element, a giant magnetoresistance (GMR) element, a magnetic tunnel junction (MTJ) element and a tunneling magnetoresistance (TMR) element.

BRIEF DESCRIPTION OF THE DRAWINGS

The foregoing features of the disclosure, as well as the disclosure itself may be more fully understood from the following detailed description of the drawings, in which.

DETAILED DESCRIPTION

Figure 1:
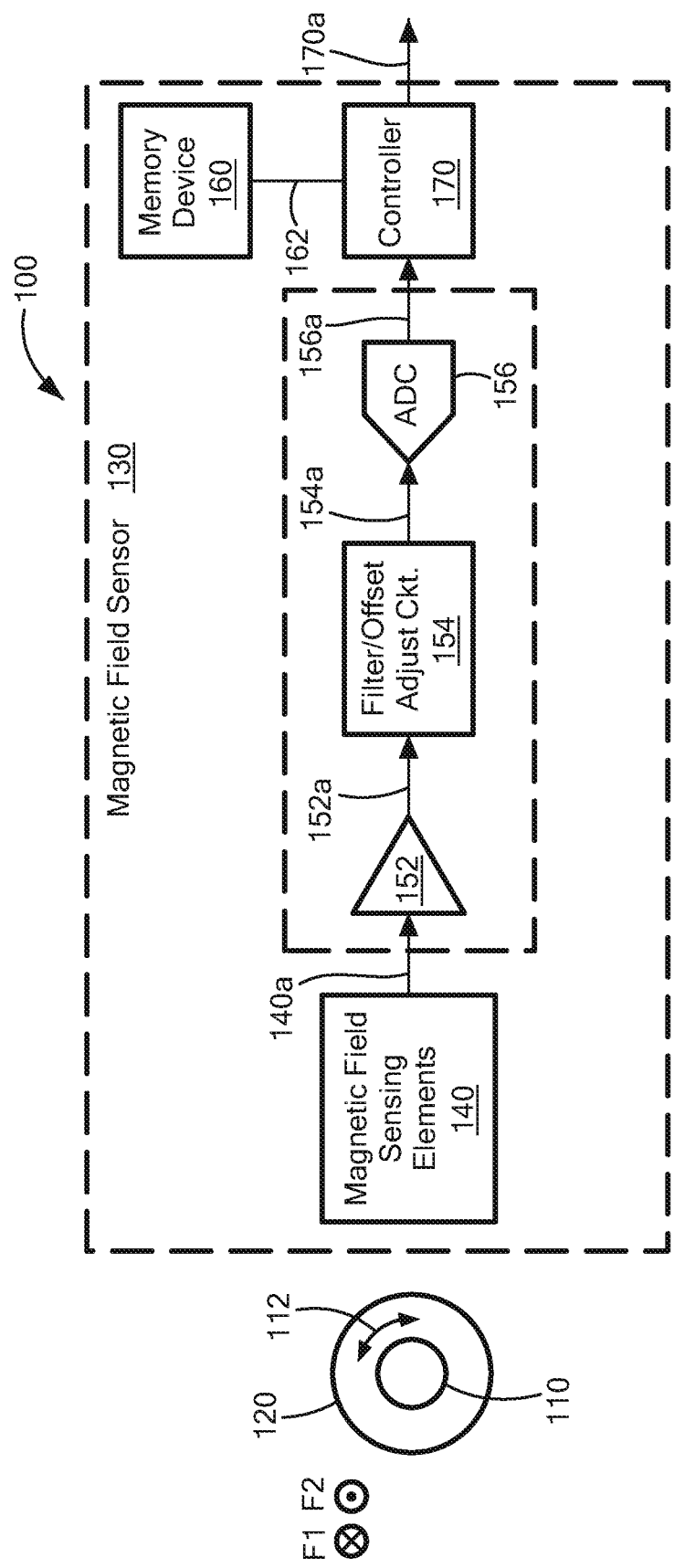
FIG. 1 is a block diagram of an example circuit for detecting motion of an object according to the concepts and circuits described herein.

The features and other details of the disclosure will now be more particularly described. It will be understood that particular embodiments described herein are shown by way of illustration and not as limitations of the concepts, systems and techniques described herein. The principal features of this disclosure can be employed in various embodiments without departing from the scope of the disclosure.

Definitions

For convenience, certain introductory concepts and terms used in the specification are collected here.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor.

As is known, there are different types of Hall effect elements, for example, a planar Hall element, a vertical Hall element, and a Circular Vertical Hall (CVH) element.

As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). Of these magnetoresistance elements, the GMR, MTJ, and the TMR elements operate with spin electronics (i.e., electron spins), which result in a resistance of the GMR element or the TMR element being related to an angular direction of a magnetization in a so-called "fee-layer."

The magnetic field sensing element may be a single element or, alternatively, may include two or more magnetic field sensing elements arranged in various configurations, e.g., a half bridge or full (Wheatstone) bridge. Depending upon the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used here, the term "motion" is used to describe a variety of types of movement associated with an object, for example, including rotational movement (or "rotation") and linear (or "rectilinear") movement of the object. A "motion detector" may, for example, detect rotation of an object. A "rotation detector" is a particular type of "motion detector."

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital. The "controller" described herein can be a "processor."

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

While examples below describe circuits for detecting motion of specific objects (e.g., knobs in automobile headlight switch assemblies), it should be appreciated that the circuits disclosed herein may be found suitable for detecting motion of a variety of objects.

Additionally, while magnetic field sensors including a specific number of magnetic field sensing elements (e.g., two sensing elements) are described in several examples below, such is discussed to promote simplicity, clarity and understanding in the description of the concepts, systems, circuits and techniques sought to be protected herein. Such is not intended to be, and should not be construed as, limiting. The magnetic field sensors disclosed herein may be implemented using more than or less than the specific number of sensing elements. It follows that the term "sensing element" and can be used to describe more than one physical semiconductor structure (for example, more than one magnetoresistance element yoke) coupled together in such a way as to generate one or more magnetic field signals in response to a magnetic field.

Further, it should be appreciated that, as used herein, relational terms, such as "first," "second," "top," "bottom," and the like, may be used to distinguish one element (e.g., sensing element) from another element (e.g., another sensing element) without necessarily requiring or implying any physical or logical relationship or order between such elements. Additionally, relational terms such as "first," "second," and the like may be used to distinguish one example spacing between two or more elements and/or surfaces (e.g., reference surfaces) from another example spacing between such elements or surfaces without necessarily requiring or implying any order between such spacings.

Referring now to FIG. 1, an example circuit 100 for detecting motion of an object 120 includes a magnetic field sensor 130. The magnetic field sensor 130 is disposed proximate to (e.g., substantially above or beneath) the object 120 and supported by a semiconductor substrate (not shown in FIG. 1). The sensor 130 includes a plurality of magnetic field sensing elements 140 and at least one signal path, or channel 150 (e.g., an analog, digital or mixed signal path). The sensor 130 also includes a memory device 160 (e.g., EEPROM, flash memory or other storage device) coupled via signal path 162 to a controller 170. In the illustrative embodiment of FIG. 1, one or more outputs of the sensing elements 140 are coupled to inputs of channel 150. An output of channel 150 is coupled to an input of the controller 170. It should be appreciated that one or more portions of the sensor circuitry (e.g., signal path 150) may be provided as separate circuits (e.g., provided on separate substrates or provided as separate integrated circuit packages). In some embodiments, the magnetic field sensor 130 may be provided in the form of a magnetic field sensor integrated circuit (IC).

The sensing elements 140 may include one or more magnetic field sensing elements driven by one or more current and/or voltage sources as is generally known. The sensing elements 140, which may be of a same magnetic field sensing element type (e.g., Hall effect elements) in some embodiments or of a combination of magnetic field sensing element types (e.g., Hall effect elements and magnetoresistance elements) in other embodiments, may be configured to generate respective magnetic field signals 140a in response to an applied magnetic field. In some embodiments, it may be preferred if the sensing elements 140 are provided having substantially matched (or ideally identical) characteristics, but this need not be so. The magnetic field may be generated and affected in various ways depending upon the position of object 120 with respect to the sensor 130 (i.e., the sensing elements 140 in the sensor 130) and the type of object 120. For example, the object 120 may include a magnetic material (e.g., iron, cobalt, nickel, steel, etc.) and the magnetic field may be generated and affected by motion (e.g., linear and angular motion) of the object 120 with respect to the sensor 130. The magnetic field may also be generated by a magnet (not shown) coupled to or disposed proximate object 120 (described below in connection with FIGS. 2A-4B) and be affected by motion of the object 120. Circuit 100 may thus detect linear and/or angular motion of object 120. Accordingly, circuit 100 may be considered as an angle and amplitude encoder.

Motion of the object 120 can result in variations of the magnetic field sensed by the sensing elements 140 and, in turn, may result in variations of the magnetic field signals 140a generated by the sensing elements 140. As will be described in further detail below, at least one of the magnetic field signals 140a generated by the sensing elements 140 is indicative of an angular position of the magnetic field with respect to the sensor 130 and at least one of the magnetic field signals 140a is indicative of an amplitude of the magnetic field.

For example, in one illustrative configuration of the sensor system including circuit 100, the object 120 may be provided as a knob or other mechanical structure in an automobile headlight switch assembly. In such an embodiment, the knob 120 can be disposed on or coupled to a shaft 110 in the automobile headlight switch assembly configured to rotate in one or more directions 112. An angle of the magnetic field sensed by the sensing elements 140 may vary based upon rotation of the object 120 and the shaft 110. Additionally, the at least one of the magnetic field signals 140a indicative of the angular position of the magnetic field may vary based upon rotation of the object 120 and the shaft 110.

The object 120 can also be movably coupled to the shaft 110 and configured to move about the shaft 110 in a direction parallel to an elongated portion (i.e., a length) of the shaft 110 such that various spacings (e.g., air gaps) may exist between the object 120 and a reference surface (e.g., a reference surface of the sensor 130). The spacings may, for example, exist based upon a force (e.g., a force F1, into the page, or a force F2, out of the page) applied to the object 120. The force F1 may correspond to a user pushing the object 120, and the force F2 may correspond to the user pulling the object 120. As will become apparent from the description herein below, an amplitude (i.e., a strength) of the magnetic field sensed by the sensing elements 140 may vary based upon the various spacings between the object 120 and the reference surface. Consequently, the magnetic field signals 140a indicative of the amplitude of the magnetic field may vary based upon the various spacings between the object 120 and the reference surface.

The channel 150 is coupled to receive the magnetic field signals 140a at one or more inputs and configured to generate a signal (e.g., digital signal 156a) representative of the magnetic field signals 140a at an output. In particular, in channel 150, an amplifier 152 is coupled to receive the magnetic field signals 140a at one or more inputs and configured to generate an amplified signal 152a at an output. Additionally, a filter/offset adjustment circuit 154 (e.g., a programmable analog filter and/or an offset adjustment processor) is coupled to receive the amplified signal 152a at an input and configured to generate a filtered and/or offset adjusted signal 154a at an output. Further, an analog-to-digital converter (ADC) 156 is coupled to receive the filtered and/or offset adjusted signal 154a at an input and configured to generate a corresponding digital signal 156a at an output. The digital signal 156a is provided to a corresponding input of controller 170. It should be appreciated that illustrative signal path 150 is but one of many potential configurations of signal paths for processing magnetic field signals (e.g., magnetic field signals 140a).

The controller 170 may be provided as a synchronous digital controller or an analog controller. Controller 170 is coupled to receive at least the digital signal 156a at a respective input and is configured to generate a controller output signal 170a at a corresponding output. The controller output signal 170a may correspond to output signal of the sensor 130 and may be indicative of at least an angular position (i.e., an angle) of the magnetic field with respect to the sensor 130 and an amplitude (i.e., a strength) of the magnetic field. The output signal 170a can also be an encoded output signal which is indicative of one of a plurality of encoded spatial regions (e.g., predetermined spatial regions) corresponding to the angular position of the magnetic field with respect to the sensor 130 and/or the amplitude of the magnetic field.

The encoded output signal 170a can be provided in a variety of signal formats, including, but not limited to, a Single-Edge Nibble Transmission (SENT) format, an Inter-Integrated Circuit ($I^2C$) format, a Pulse-width modulation (PWM) format, or a two-state binary format. Additionally, the angular position of the magnetic field may correspond to one of N discrete angular positions of the object 120 with respect to a reference point on a reference surface of the sensor 130. Further, the amplitude of the magnetic field may correspond to one of M possible spacings (e.g., air gaps) between the object 120 and the reference surface.

The memory device 160 coupled to the controller 170 may be configured to store one or more parameters associated with processing the digital signal 156a and generating output signal 170a. Such parameters include but are not limited to a trim values for calibration and offset correction coefficients for the filter/offset adjust circuit 154. Additionally, the memory device 160 may be configured to provide such parameters to the controller 170 (and/or other circuitry internal to or external from the sensor 130) via the signal line 162. In some embodiments, the memory device 160 may also be configured to store values associated with the angular positions and amplitudes of the magnetic field as represented in the output signal 170a. Further, in some embodiments, the output signal 170a may be received by other circuitry (e.g., analog, digital or mixed-signal circuitry) (not shown) in the sensor system for further processing (e.g., by an engine control unit or ECU).

With the above-described sensing arrangement, the sensor 130 (and circuit 100) can detect both an angular position of a magnetic field and an amplitude of the magnetic field. In accordance with the concepts, systems, circuits and techniques disclosed herein, such a sensing arrangement (e.g., a contactless sensing arrangement) provides for substantially less circuitry than conventional sensing arrangements in which at least one sensing circuit is required for sensing an angular position of a magnetic field and at least another, separate sensing circuit is required for sensing an amplitude of the magnetic field. The use of multiple sensing circuits can be costly, particularly with respect to valuable circuit space. Additionally, the use of multiple sensing circuits provided on separate die may be undesirable, especially in space conscious applications. Thus, the concepts, circuits and techniques described herein may provide one or more of space savings, power consumption reduction and simplicity or reduced circuitry complexity relative to prior art approaches.

While the sensor 130 may be provided in the form of an electronic circuit with an analog front end portion and a digital portion, as shown, it will be appreciated that the particular delineation of which circuit functions are implemented with analog circuitry or with digital circuitry and signals can be varied. For example, one or more portions of the signal path 150 (e.g., amplifier 152, filter/offset adjust circuit 154, ADC 156) may be provided as part of the controller 170. The controller 170 can, for example, perform the function, operation, or sequence of operations of one or more portions of the signal path 150. Additionally, the memory device 160 can be provided as part of the controller 170 (e.g., as onboard EEPROM). Further, some of the illustrated circuit functions can be implemented on separate circuits (e.g., additional substrates within the same integrated circuit package, or additional integrated circuit packages, and/or on circuit boards).

Further, while the object 120 may be provided as separate from the circuit 100 in some embodiments, the object 120 may be provided as part of the circuit 100 in other embodiments. For example, in an automobile headlight switch assembly (e.g., a so-called "Euroswitch" proximity switch) including the circuit 100, the object 120 can be provided in a same housing as the sensor 130 and be provided as part of or separate from the circuit 100. It should be appreciated that the circuit 100 may be included in or used with a number of circuits, assemblies and applications including, but not limited to, a contactless radio tuning/volume adjust button, a mirror positioning control button, a light dimmer control button and a cruise control circuit (e.g., as may be found on a steering wheel).

Additionally, while the applied magnetic field detected by the sensor 130 is described as generated by a magnet (not shown) coupled to or disposed proximate object 120 in some embodiments, it should be appreciated that the magnet may be coupled in a number of configurations in such embodiments. For example, the magnet may be coupled to or proximate the sensor 130. In such embodiments, the circuit 100 or sensor 130 may include a magnetic field concentrator (e.g., an external concentrator) which deflects the magnetic field generated by the magnet. Additionally, the sensing elements 140 may sense or detect an angle and/or an amplitude of the magnetic field deflection and generate the respective magnetic field signals 140a in response thereto.

Additional aspects of the concepts, systems, circuits and techniques sought to be protected herein, with particular emphasis on the magnetic field sensors in circuits for detecting motion of an object, are described in conjunction with the figures below.

Figure 2A:
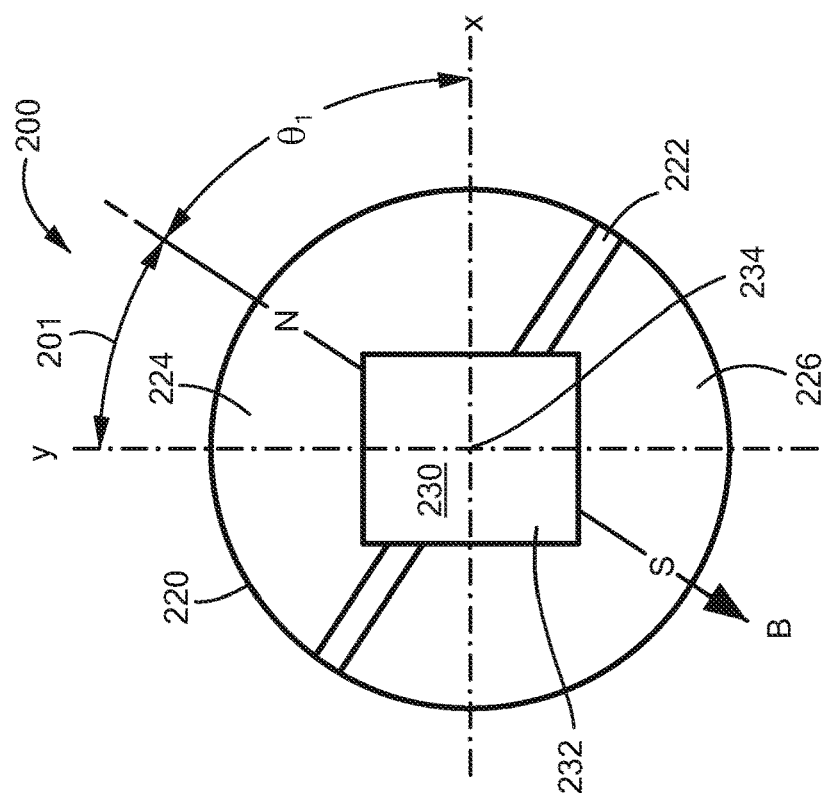
FIG. 2A is a plan view of an example circuit for detecting an angular position associated with an object.
Figure 2:
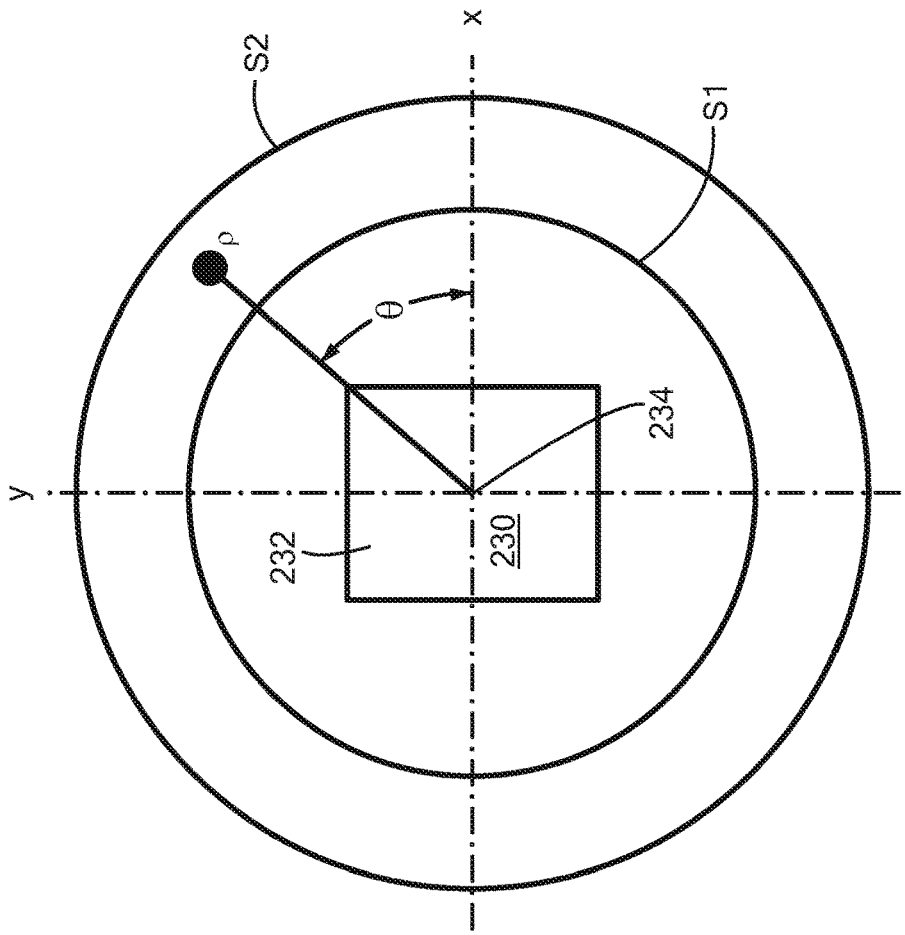
FIG. 2 is a plan view of an example magnetic field sensor which may be of the type suitable for use with the circuit of FIG. 1.

Referring to FIG. 2, an example magnetic field sensor 230 which may, for example, be of the type suitable for use with the circuit of FIG. 1, is shown configured to sense an angular position ($\theta$) of a magnetic field with respect to the sensor 230. Additionally, sensor 230 is shown configured to sense an amplitude ($\rho$) of the magnetic field at a plurality of spacings (here, first and second spacings S1, S2). The sensor 230 may be disposed on a substrate (e.g., a first surface a substrate having first and second opposing surfaces). Additionally, the sensor 230 may include a plurality of magnetic field sensing elements (not shown in FIG. 2). The sensing elements, which may be the same as or similar to sensing elements 140 of FIG. 1, may include one or more of an anisotropic magnetoresistance (AMR) element, a giant magnetoresistance (GMR) element, a magnetic tunnel junction (MTJ) element and a tunneling magnetoresistance (TMR) element. Additionally, the sensing elements may include one or more Hall effect elements (e.g., vertical Hall effect elements).

The sensor 230 is configured to generate a respective plurality of magnetic field sensor output signals (e.g., 170a, shown in FIG. 1) in response to a magnetic field associated with an object (e.g., 120, shown in FIG. 1) which is disposed proximate to (e.g., substantially above or beneath) the sensor 230. At a first spacing S1 between the object (e.g., a reference surface of the object) and a reference surface 232 of the sensor 230, a first magnetic field (i.e., an applied magnetic field) is sensed by one or more of the sensing elements in sensor 230. In response to the sensed magnetic field, the sensor 230 provides a first output signal (e.g., output signal 170, shown in FIG. 1) indicative of the sensed magnetic field. The amplitude (or other characteristic) of the output signal is related to the spacing between the object and sensor reference surfaces. Additionally, at a second, different spacing between the object 120 (e.g., the reference surface on the object) and the reference surface 232, a second, different magnetic field is sensed by one or more of the sensing elements. In response to the sensed magnetic field, the sensor 230 provides a second output signal (e.g., output signal 170a, shown in FIG. 1) indicative thereof.

For example, in one illustrative configuration of the circuit including sensor 230, the sensor 230 may include two sensing elements having orthogonal axes of maximum sensitivity with respect to the reference surface 232 of the sensor 230. A first one of the sensing elements may sense a projection of the magnetic field (e.g., the first and second magnetic fields) in a first direction with respect to a reference point 234 on the reference surface 232. The first direction may correspond to a direction aligned with an axis of a reference coordinate system.

In the example of FIG. 2, a Cartesian Coordinate System is used and the first direction corresponds to a direction aligned with the x-axis (x) of the coordinate system with respect to the reference point 234. Additionally, the respective magnetic field projection may correspond to a magnetic field projection in an x-direction (Bx). A second one of the sensing elements may sense a projection of the magnetic field in a second, different direction. The second direction may correspond to a direction aligned with the y-axis (y) of the coordinate system shown in FIG. 2. Additionally, the respective magnetic field projection may correspond to a magnetic field projection in an y-direction (By).

A sum of the magnetic field projections (e.g., Bx, By) sensed by the first and second sensing elements, or $\sqrt{(Bx)^2+(By)^2}$, may be used to determine an amplitude (p) of the magnetic field. The determined amplitude of the magnetic field may correspond to one of M possible spacings (e.g., first spacing S1 or second spacing S2) between the object and the reference surface 232. The amplitude of the magnetic field may also be determined based upon projections of the magnetic field within a given encoded spatial region of the encoded spatial regions. The encoded spatial regions may have a substantially circular shape (as shown), a square shape, an ellipse shape or a number of other shapes in some embodiments.

Additionally, an angular position (θ) of the magnetic field with respect to the sensor 230 may be determined by computing the inverse tangent (i.e., $\tan^{-1}$) of the sensed magnetic field projections. For example, angular position (θ) may be determined by computing the inverse tangent of the magnetic field projection sensed by the second sensing element (e.g., By) with respect to the magnetic field projection sensed by the first sensing element (e.g., Bx) or $$\tan^{-1}\frac{By}{Bx},.$$

The determined angular position (θ) of the magnetic field may correspond to one of N possible discrete angular positions of the object with respect to the sensor 230. Each of the N discrete angular positions and each of the M possible spacings may correspond to one of a plurality of encoded spatial regions, as will be further described in conjunction with the figures below. Although the above example uses a Cartesian Coordinate System, those of ordinary skill in the art will appreciate that other coordinate systems (e.g. polar or spherical systems) may also be used.

In another example configuration of the circuit including sensor 230, the sensor 230 can include three (or more) sensing elements coupled in a differential sensing arrangement. A first sensing element and a second sensing element (e.g., a reference sensing element) can be used to sense the projection of the magnetic field in the first direction. Additionally, the second sensing element and a third sensing element can be used to sense the projection of the magnetic field in the second direction.

It should be appreciated that substantially any number of sensing elements may be found suitable for sensing the magnetic field. It should also be appreciated that substantially any number of discrete angular positions of the object with respect to the sensor 230 and spacings between the object and a reference surface of the sensor 230 may exist, as will be further described in conjunction with the figures below.

Referring now to FIG. 2A, in which like elements of FIG. 2 are shown having like reference designations, an example circuit 200 for detecting motion of an object (e.g., an object including or coupled to magnet 220) is shown to include magnetic field sensor 230. The sensor 230 has a first surface 232 (e.g., a reference surface) adjacent to magnet 220 and a second, opposing surface 233 distal from magnet 220. Additionally, magnet 220 (e.g., illustrated as a circular or ring magnet in this example embodiment), has a first surface 222 adjacent to the sensor 230 and a second, opposing surface (not shown) distal from the sensor 230. In this illustrated embodiment, the second magnetic surface is coupled to the object and, thus, the magnet 220 is disposed between sensor 230 and the object. The magnet 220 may also be provided as part of the object. Further, the object may include a magnetic material representative of the magnet 220.

Magnet 220 also has a first portion 224 at which a first magnetic pole of the magnet 220 exists. Additionally, magnet 220 has a second, opposing portion 226 at which a second magnetic pole of the magnet 220 exists. In this illustrated embodiment, the first portion 224 corresponds to a north magnetic pole N of the magnet 220 and the second portion 226 corresponds to a south magnetic pole S of the magnet 220.

Sensor 230 is configured to generate a respective plurality of magnetic field sensor output signals in response to a magnetic field associated with the object. In particular, the magnet 220 may generate a magnetic field and rotation of the object and magnet 220 in one or more directions 201 can result in variations of the magnetic field sensed by the sensor 230. These variations of the magnetic field sensed by the sensor 230 can result in variations of the magnetic field sensor output signals generated by the sensor 230. At least one of the sensor output signals is indicative of an angular position of the magnetic field with respect to the sensor 230. Such sensor output signals may also be indicative of an angular position of the object and magnet 220 with respect to the sensor 230.

For example, in this illustrated embodiment, the magnet 220 is shown rotated at a first example angular position $θ_1$ with respect to the sensor 230. At angular position $θ_1$, the sensor 230 senses a particular magnetic field, which may be used to determine the angular position $θ_1$. Specifically, in one embodiment, the angular position $θ_1$ may be determined using multiple sensed projections of the magnetic field. For example, a first sensing element or group of sensing elements of sensor 230 may sense a first projection of the magnetic field in a first direction (e.g., an X-direction of the coordinate system shown in FIG. 2A) with respect to reference point 234 on reference surface 232 of sensor 230. Additionally, a second sensing element or group of sensing elements may sense a second projection of the magnetic field in a second, different direction (e.g., a y-direction of the coordinate system shown in FIG. 2A) with respect to reference point 234. In response thereto, sensor 230 may generate respective magnetic field sensor output signals indicative of the first and second sensed magnetic field projections (Bx, By).

Such sensor output signals may be received by circuitry in circuit 200, which circuitry (e.g., controller 170, shown in FIG. 1) may be configured to provide an output signal of the magnetic field sensor indicative of the angular position $θ_1$. In one embodiment, the output signal is provided based, at least in part, on a computation of the inverse tangent of the second magnetic field projection (Bx) with respect to the first magnetic field projection (By), or $$\tan^{-1}\frac{By}{Bx}.$$

The angular position $θ_1$ may correspond to one of N possible angular positions (e.g., two or more angular positions) of the magnet 220 and the object. Additionally, each of the N angular positions may correspond to an encoded spatial region. The encoded spatial region can be a user or a factory encoded spatial region, as will be described further in conjunction with figures below.

It should be appreciated that magnet 220 and the object may be but one type of magnet and object to which sensor 230 can be responsive. Additionally, it should be appreciated that rotation is but one type of motion to which the sensor 230 can be responsive, as will be appreciated from figures below.

Figure 3:
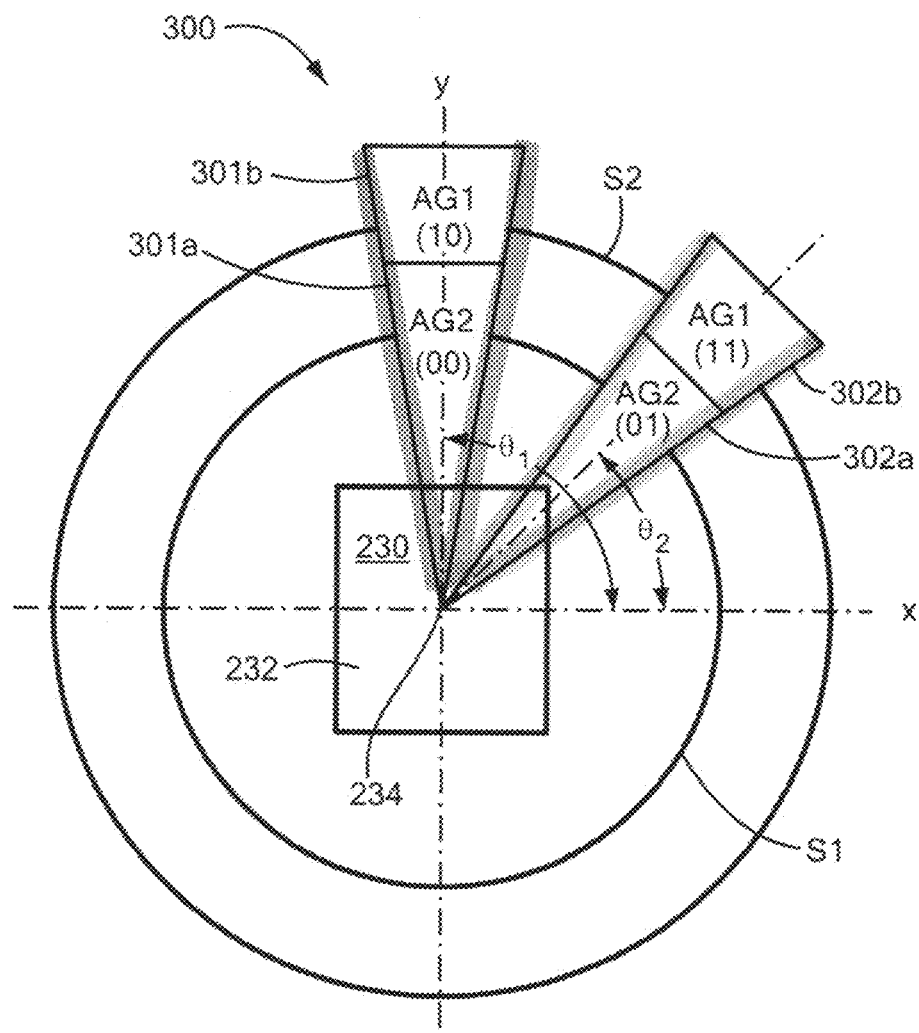
FIG. 3 is a plan view of an example circuit for detecting a plurality of angular positions and a plurality of spacings of an object relative to a magnetic field sensor.
Figure 3A:
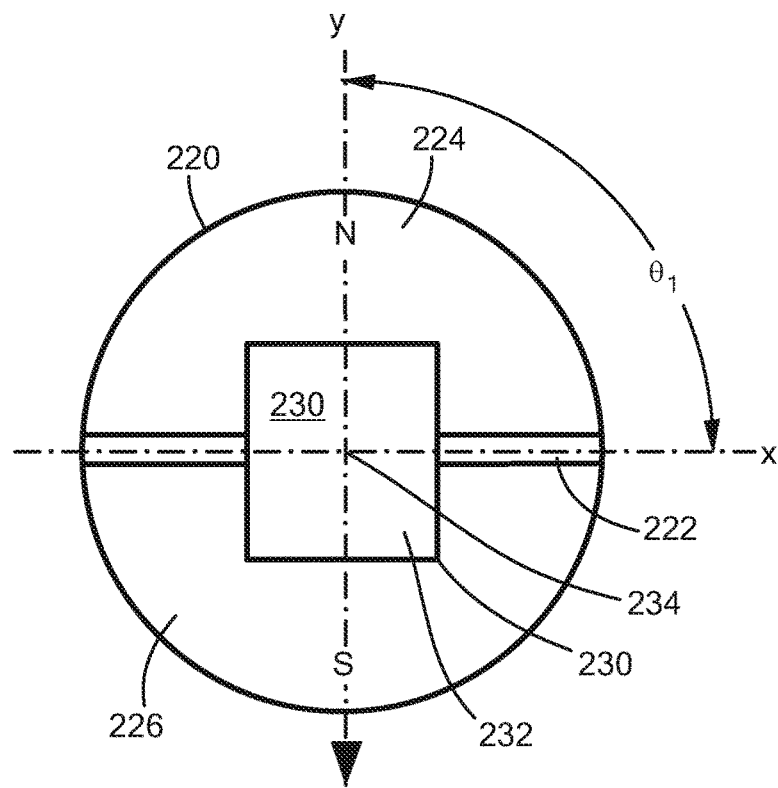
FIG. 3A is a plan view of the circuit of FIG. 3 detecting a first example angular position associated with an object.
Figure 3B:
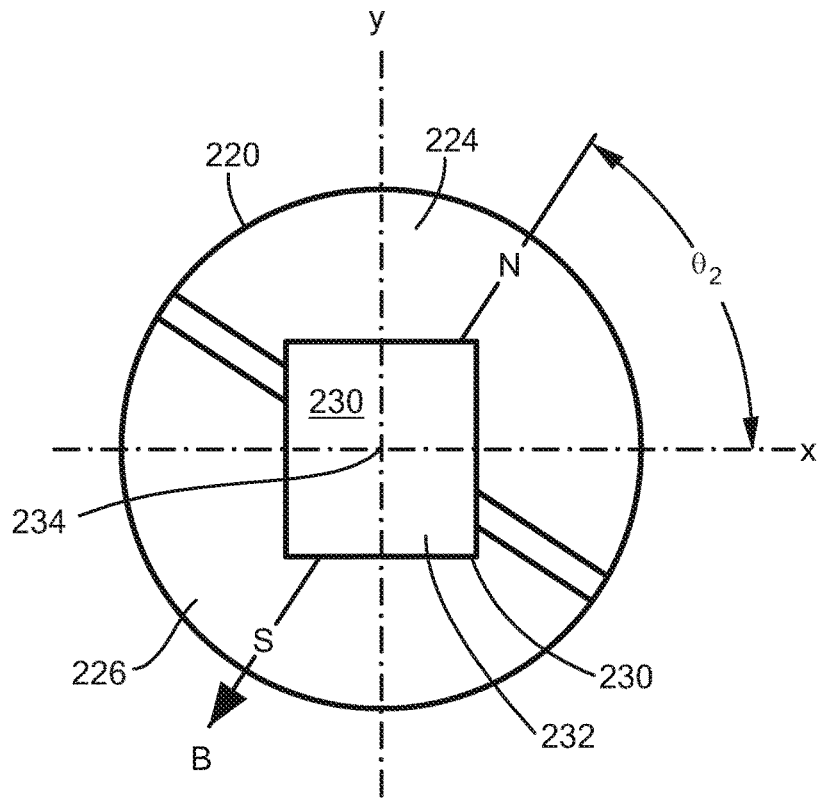
FIG. 3B is a plan view of the circuit of FIG. 3 detecting a second example angular position associated with an object.
Figure 3C:
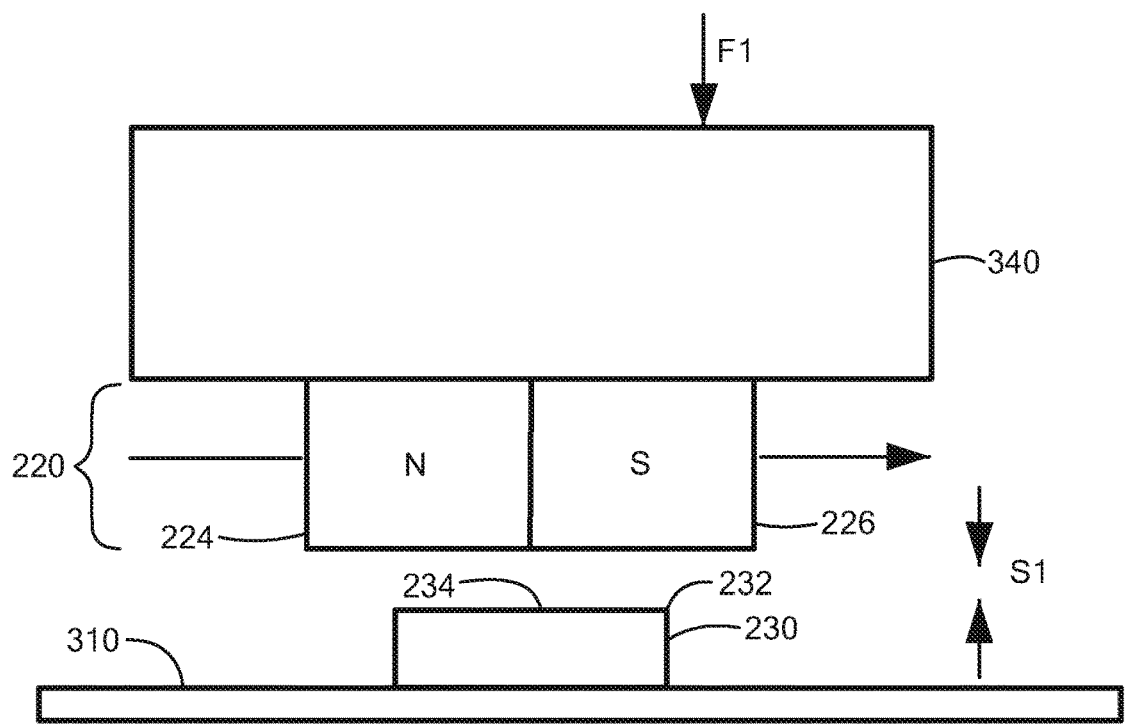
FIG. 3C is a side view of the circuit of FIG. 3 detecting a first example spacing associated with an object.
Figure 3D:
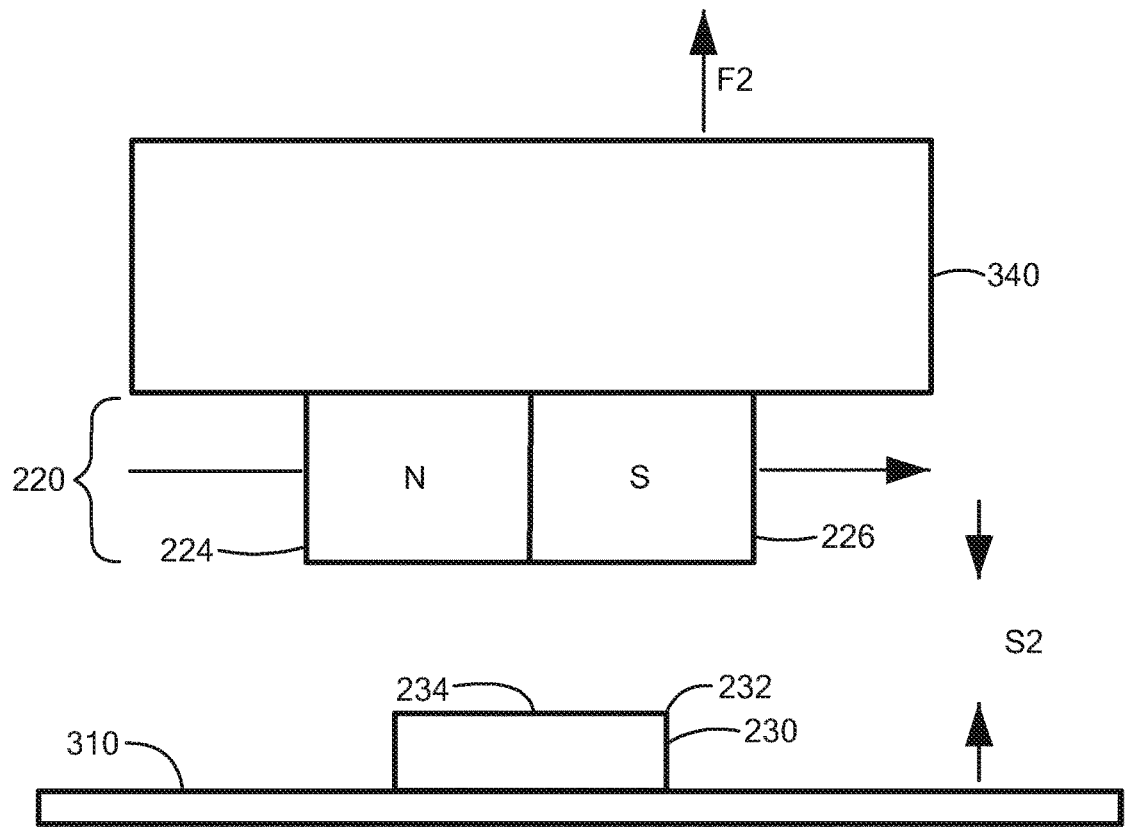
FIG. 3D is a side view of the circuit of FIG. 3 detecting a second example spacing associated with an object.

Referring to FIGS. 3-3D, an example circuit 300 (e.g., a two-bit or four region encoder) for detecting motion of an object (e.g., an object coupled to or including magnet 220) in an example sensor system according to the disclosure is shown. The circuit 300 is configured to detect a plurality of angular positions (e.g., $\theta_1$, $\theta_2$) of the object, as shown in FIGS. 3-3B, for example. Additionally, the circuit 300 is configured to detect a plurality of spacings (e.g., S1, S2) between the object and a reference surface (e.g., surface 232), as shown in FIGS. 3, 3C and 3D, for example.

Referring to FIG. 3, circuit 300 is shown to include magnetic field sensor 230. The sensor 230 may be disposed on a first surface of a substrate (e.g., 310, shown in FIG. 3A) and configured to sense a magnetic field associated with the object (not shown) in a plurality of directions. The magnetic field may be generated by a magnet (e.g., 220, shown in FIG. 3A) and motion of the object may affect the magnetic field sensed by the sensor 230. The object may be coupled to or include the magnet. The object may also include a magnetic material and the magnetic material may generate at least part of the magnetic field sensed by the sensor 230.

In this illustrated embodiment, the sensed magnetic field may correspond to a magnetic field associated with one of four spatial positions 301a, 301b, 302a, 302b of the object (and the magnet). Each of the spatial positions 301a, 301b, 302a, 302b is indicative of a particular angular position ($\theta_1$ or $\theta_2$) and a particular spacing (S1 or S2) associated with the object. Additionally, each of the angular positions and spacings may be indicative of one of a plurality of encoded spatial regions. The encoded spatial regions can be linearly encoded or encoded by a particular function (e.g., using controller 170, shown in FIG. 1). As one example, the encoded spatial regions may be defined substantially arbitrarily by a pair of angle values and a pair of amplitude values. In such example, a magnetic field falling within a given encoded spatial region of the encoded spatial regions (e.g., with an angle and amplitude of the magnetic field falling within associated limits of the encoded spatial region) may be detected and encoded according to system requirements (e.g., of the circuit 300). The encoded spatial regions can also be factory or user encoded spatial regions based on the application, for example. In some instances, the encoded spatial regions may be application specific.

In particular, in this illustrated embodiment, spatial position 301a corresponds to a first angular position $\theta_1$ of the object with respect to reference point 234 on reference surface 232 of sensor 230 (described below in connection with FIG. 3A). Spatial position 301a also corresponds to a first example spacing S1 between the object and reference surface 232 (described below in connection with FIG. 3C). Similarly, spatial position 301b corresponds to the first angular position $\theta_1$ of the object with respect to reference point 234, but corresponds to a second, different example spacing S2 between the object and reference surface 232 (described below in connection with FIG. 3D).

Further, in this illustrated embodiment, spatial position 302a corresponds to a second, different example angular position $\theta_2$ of the object with respect to reference point 234 (described below in connection with FIG. 3B). Spatial position 302a also corresponds to indicative a first spacing S1 between the object and reference surface 232. Similarly, spatial position 302b also corresponds to the second angular position $\theta_2$ of the object with respect to reference point 234, but corresponds to a second spacing S2 between the object and reference surface 232.

Referring to the first angular position $\theta_1$ of magnet 220 (and the object) shown in FIG. 3A, sensor 230 is configured to sense a magnetic field associated with such angular position $\theta_1$. In response to the sensed magnetic field, sensor 230 provides an output signal (e.g., output signal 170, shown in FIG. 1) indicative thereof. The output signal may be received by circuitry (e.g., controller 170, shown in FIG. 1) for processing. First angular position $\theta_1$ may, for example, exist based upon a first rotation of magnet 220 and the object in one or more directions 312. Additionally, the first angular position $\theta_1$ may correspond to a first or initial angular position of magnet 220 and the object, which angular position may be associated with a first encoded spatial region.

For example, in one example configuration of a sensor system including circuit 300, the object may be provided as a knob in an automobile headlight switch assembly having push-button functionality. In such an embodiment, rotation of the knob to first angular position $\theta_1$, or a spatial region associated with first angular position $\theta_1$, may correspond to a first selection of a plurality of potential selections being made. As one example, such rotation may correspond to a selection (e.g., a user selection) of a first lighting accessory type (e.g., headlights) in the automobile.

Referring also to the second angular position $\theta_2$ of magnet 220 and the object 340 shown in FIG. 3B, sensor 230 is configured to sense a magnetic field associated with such angular position $\theta_2$. In response to the sensed magnetic field, sensor 230 provides an output signal indicative thereof. Second angular position $\theta_2$ may, for example, exist based upon a second rotation of magnet 220 and the object in one or more directions 312. Additionally, the second angular position $\theta_2$ may correspond to a second or subsequent angular position of the object 340, which angular position may be associated with a second encoded spatial region.

For example, in the above-described illustrative configuration in which object 340 is provided as a knob in an automobile headlight assembly, rotation of the knob to second angular position $\theta_2$, or a spatial region associated with second angular position $\theta_2$, may correspond to a second, different selection being made. As one example, such rotation may correspond to selection of a second lighting accessory type (e.g., fog lights) in the automobile.

Referring also to the first example spacing S1 between the object 340 and the sensor 230 shown in FIG. 3C, sensor 230 is configured to sense a magnetic field associated with such spacing S1 with respect to reference surface 232. In response to the sensed magnetic field, sensor 230 provides an output signal indicative thereof. An amplitude (or other characteristic) of the output signal is related to the spacing S1. First spacing S1 may, for example, exist based upon a force F1 applied to the object 340. The force F1 may correspond to a user pushing the object 340 in a direction towards the reference surface 232. Additionally, the first spacing S1 may correspond to a first or depressed position of the object 340 and may be associated with a third encoded spatial region. For example, in the above-described example embodiment in which the object 340 is provided as a knob in an automobile headlight assembly, first spacing S1 may correspond to a depressed or first position (e.g., an on position)

or state of the push-button functionality. Additionally, motion of the object to the first spacing S1 may result in a selection associated with the first position or state of the push-button functionality.

When first spacing S1 is combined with angular position $\theta_1$, as represented by spatial position 301a in the illustrated embodiment, the first spacing S1 may correspond to a first state of the push-button functionality associated with the selection at angular position $\theta_1$. For example, spatial position 301a may correspond to an on state of the first type of a lighting accessory associated with rotation of the knob to angular position $\theta_1$. Additionally, when first spacing S1 is combined with angular position $\theta_2$, as represented by spatial position 302a in the illustrated embodiment, the first spacing S1 may correspond to a first state of the push-button functionality associated with the selection at angular position $\theta_2$. For example, spatial position 302a may correspond to an on state of the second type of lighting accessory associated with rotation of the knob to angular position $\theta_2$.

Referring also to second spacing S2 between the object and the sensor 230 shown in FIG. 3D, sensor 230 is configured to sense a magnetic field associated with such spacing S2. In response to the sensed magnetic field, sensor 230 provides an output signal indicative thereof. An amplitude (or other characteristic) of the output signal is related to the spacing S2. Second spacing S2 may, for example, exist based upon a force F2 applied to the object 340 and may be associated with a fourth encoded spatial region. The force F2 may correspond to a user pulling the object 340 in a direction away from the reference surface 232. Additionally, the second spacing S2 may correspond to a second or initial linear position of the object 340 and may be associated with an encoded spatial region. For example, in the above-described example embodiment in which the object 340 is provided as a knob in an automobile headlight assembly, second spacing S2 may correspond to a second position (e.g., an off position) or a state of the push-button functionality. Additionally, motion of the object 340 to the second spacing S2 may result in a selection associated with the second position or state of the push-button functionality.

When second spacing S2 is combined with angular position $\theta_1$, as represented by spatial position 301b in the illustrated embodiment, the second spacing S2 may correspond to a second state of the push-button functionality associated with the selection at angular position $\theta_1$. For example, spatial position 302a may correspond to an off state of the first type of lighting accessory associated with rotation of the knob to angular position $\theta_1$. Additionally, when second spacing S2 is combined with angular position $\theta_2$, as represented by spatial position 302b in the illustrated embodiment, the second spacing S2 may correspond to a second state of the push-button functionality associated with rotation of the knob to angular position $\theta_2$. For example, spatial position 302b may correspond to an off state of the second type of lighting accessory associated with rotation of the knob to angular position $\theta_2$.

While circuit 300 is described as detecting two angular positions ($\theta_1$, $\theta_2$) and two spacings (S1, S2) in this illustrated embodiment, it should be appreciated that circuits according to the concepts and circuits described herein may be configured to detect more than two angular positions ($\theta_1$, $\theta_2$) and two spacings (S1, S2) of the object. In particular, circuits according to the concepts and circuits described herein may be configured to detect N angular positions and M spacings of the object, which may provide for an N by M region angle and amplitude encoder.

Additionally, while circuit 300 is described as detecting a like number of angular positions and spacings associated with an object in this illustrated embodiment, it should be appreciated that circuits according to the concepts and circuits described herein may be configured to detect more angular positions than spacings of the objects (described below in connection with FIGS. 4-4B). Additionally, circuits according to the concepts and circuits described herein may be configured to detect more spacings than angular positions of the object.

Figure 4:
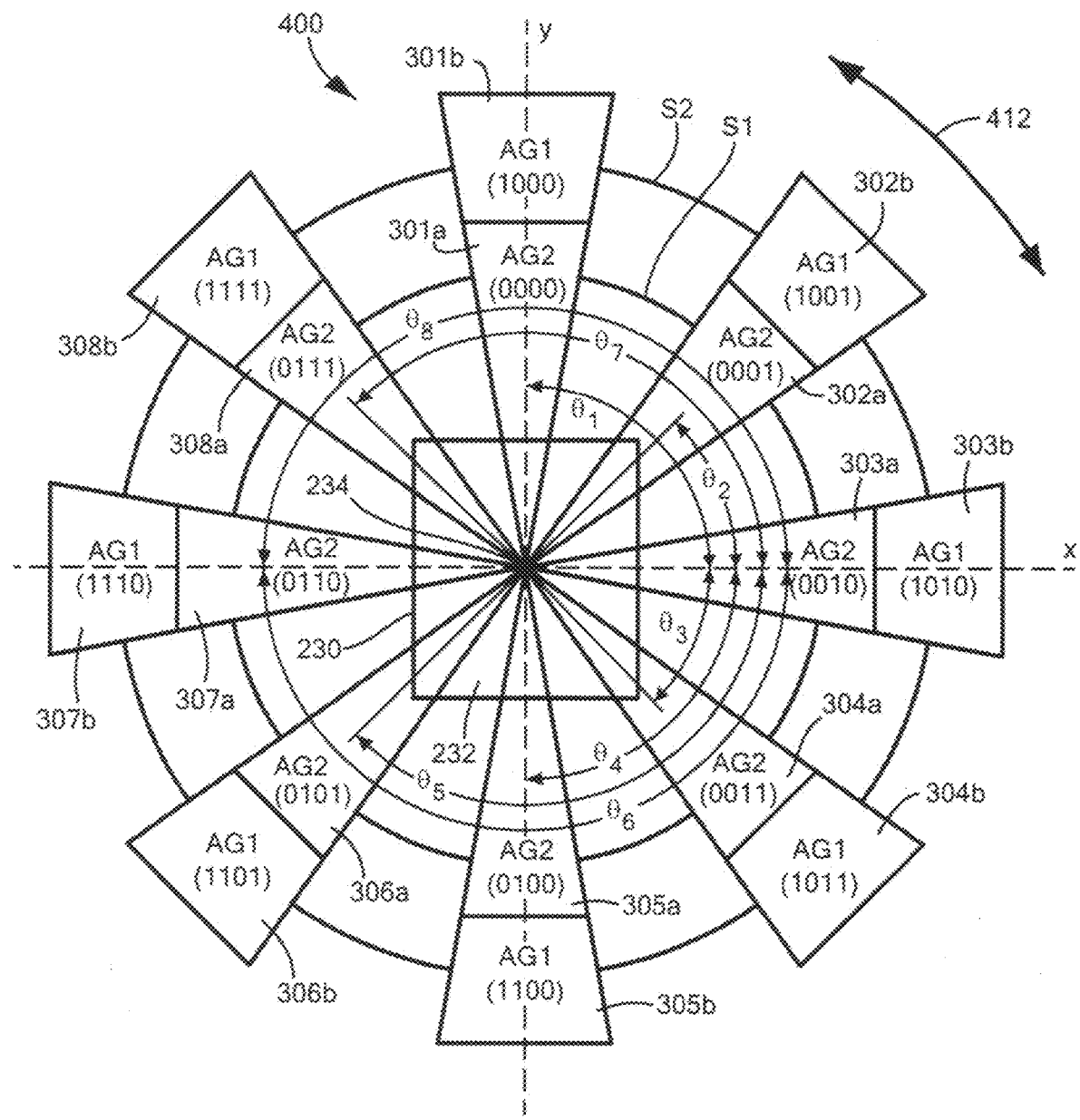
FIG. 4 is a plan view of another example circuit for detecting a plurality of angular positions and a plurality of spacings associated with an object.
Figure 4B:
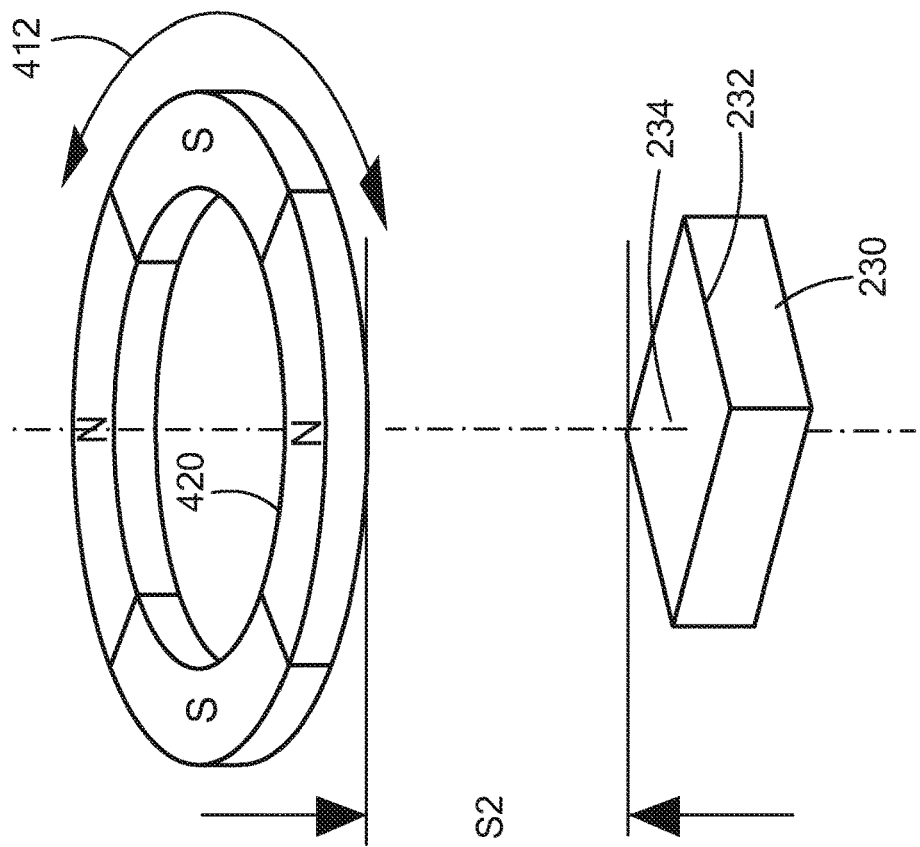
FIG. 4B is a side view of the circuit of FIG. 4 shown detecting a second example spacing associated with an object.

Referring to FIGS. 4-4B, in which like elements of FIGS. 3-3D are shown having like reference designations, another example circuit 400 (e.g., a four-bit or sixteen region encoder) for detecting motion of an object (e.g., an object coupled to or including magnet 420) according to the disclosure is shown. The circuit 400 is configured to detect a plurality of angular positions (e.g., $\theta_1$, $\theta_2$ . . . $\theta_8$) of the object. Additionally, the circuit 400 is configured to detect a plurality of spacings (e.g., S1, S2) between the object and a reference surface (e.g., surface 232).

Referring to FIG. 4, circuit 400 is shown to include magnetic field sensor 230. The sensor 230 may be disposed on a first surface of a substrate and configured to sense a magnetic field associated with the object (not shown). The magnetic field may be generated by a magnet (e.g., 420, shown in FIG. 4A) and motion of the object in one or more directions 412 may affect the magnetic field sensed by the sensor 230. The object may be coupled to or include the magnet (e.g., a ring magnet). The object may also include a magnetic material and the magnetic material may generate at least part of the magnetic field sensed by the sensor 230.

In this illustrated embodiment, the sensed magnetic field may correspond to a magnetic field associated with one of sixteen spatial positions (301a, 301b, 302a, 302b, 303a, 303b, 304a, 304b, 305a, 305b, 306a, 306b, 307a, 307b, 308a, 308b) of the object (and the magnet). Similar to the spatial positions described above in conjunction with FIG. 3 (i.e., 301a, 301b, 302a, 302b), each of the spatial positions of FIG. 4 is indicative of a particular angular position ($\theta_1$, $\theta_2$ . . . or $\theta_8$) and a particular spacing (S1 or S2) associated with the object. Additionally, each of the angular positions and spacings may be indicative of one of a plurality of encoded spatial regions.

Figure 4A:
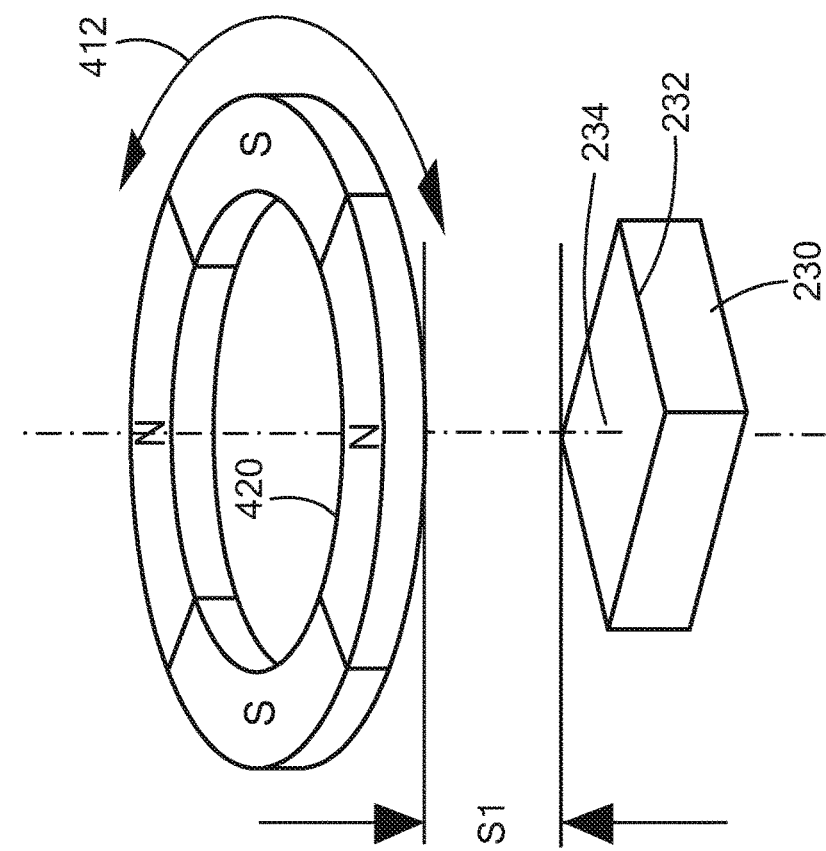
FIG. 4A is a perspective view of the circuit of FIG. 4 shown detecting a first example spacing associated with an object.

Referring to a first example spacing S1 between the object and the sensor 230 shown in FIG. 4A, sensor 230 is configured to sense a magnetic field associated with such spacing S1 with respect to a reference surface 232 of sensor 230. In response to the sensed magnetic field, sensor 230 provides an output signal (e.g., output signal 170, shown in FIG. 1) indicative thereof. The output signal indicative may be received by circuitry (e.g., controller 170, shown in FIG. 1) for processing. An amplitude (or other characteristic) of the output signal is related to the spacing S1.

When combined with any one of the angular positions ($\theta_1$, $\theta_2$, . . . or $\theta_8$) of the object with respect to reference point 234 on reference surface 232, the first spacing S1 may, for example, correspond to a first state (e.g., an off state) associated with the angular positions. For example, in the above-described example embodiment of FIGS. 3-3D in which the object to be sensed is provided as a knob in an automobile headlight assembly, the first spacing S1 may correspond to a first state of push-button functionality associated with a type of lighting accessory selected at a particular angular position (e.g., $\theta_1$).

Referring also to a second, different example spacing S2 between the object and the sensor 230 shown in FIG. 4B, sensor 230 is configured to sense a magnetic field associated with such spacing S2. In response to the sensed magnetic field, sensor 230 provides an output signal indicative thereof. An amplitude (or other characteristic) of the output signal is related to the spacing S2.

When combined with any one of the angular positions ($\theta_1$, $\theta_2$ ... or $\theta_8$) of the object with respect to reference point 234, the second spacing S2 may, for example, correspond to a second state (e.g., an on state) associated with the angular positions. For example, in the above-described example embodiment in which the object to be sensed is provided as a knob in an automobile headlight assembly, the second spacing S2 may correspond to a second state of push-button functionality associated with the type of lighting accessory selected at the angular position (e.g., $\theta_1$).

As described above and as will be appreciated by those of ordinary skill in the art, embodiments of the disclosure herein may be configured as a system, method, or combination thereof. Accordingly, embodiments of the present disclosure may be comprised of various means including hardware, software, firmware or any combination thereof.

It is to be appreciated that the concepts, systems, circuits and techniques sought to be protected herein are not limited to use in particular applications (e.g., contactless automobile headlight switch applications) but rather, may be useful in substantially any application where it is desired to detection motion of an object.

Having described preferred embodiments, which serve to illustrate various concepts, structures and techniques, which are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A circuit for detecting motion of an object, comprising:
   a semiconductor substrate having first and second opposing surfaces; and
   a magnetic field sensor disposed on the first surface of the substrate, the magnetic field sensor responsive to a magnetic field associated with the object, wherein in response to detecting a magnetic field associated with the object, the magnetic field sensor is configured to generate an output signal indicative of a respective one of a plurality of encoded spatial regions by detecting a magnetic field falling within a pair of magnetic field angle values and a pair of magnetic field amplitude values which define the respective one of the plurality of encoded spatial regions,
   wherein each of the plurality of encoded spatial regions is defined by:
   one pair of amplitude values of a plurality (M) of pairs of amplitude values, and
   one pair of angle values of a plurality (N) of pairs of angle values, wherein the plurality (N) of pairs of angle values comprises a first plurality (N) of pairs of angle values corresponding to a first pair of amplitude values representing a first spacing between the magnetic field sensor and the object, and a second plurality (N) of pairs of angle values corresponding to a second pair of amplitude values representing a second spacing between the magnetic field sensor and the object.

2. The circuit of claim 1 wherein each of the first and second spacings corresponds to a respective first and second air gap distance between a reference surface of the object and a reference surface of the magnetic field sensor.

3. The circuit of claim 1 wherein the magnetic field sensor comprises a plurality of magnetic field sensing elements configured to generate a respective plurality of magnetic field signals in response to the magnetic field, and the magnetic field sensor comprises circuitry responsive to the magnetic field signals to generate the magnetic field sensor output signal.

4. The circuit of claim 3 wherein the plurality of magnetic field sensing elements comprise two magnetic field sensing elements having axes of maximum sensitivity which are orthogonal with respect to each other.

5. The circuit of claim 4 wherein a first one of the magnetic field sensing elements is configured to sense a first projection of the magnetic field in a first direction with respect to a reference surface of the sensor, and a second one of the sensing elements is configured to sense a second projection of the magnetic field in a second direction with respect to the reference surface of the sensor which is different from the first direction, wherein a sum of the first and second magnetic field projections is used to determine an amplitude of the magnetic field, and the amplitude of the magnetic field is associated with a pair of amplitude values selected from the plurality (M) of pairs of amplitude values.

6. The circuit of claim 3 wherein the plurality of magnetic field sensing elements comprise one or more vertical Hall effect elements.

7. The circuit of claim 3 wherein the plurality of magnetic field sensing elements comprise one or more of an anisotropic magnetoresistance (AMR) element, a giant magnetoresistance (GMR) element, a magnetic tunnel junction (MTJ) element and a tunneling magnetoresistance (TMR) element.

8. The circuit of claim 3, wherein the circuitry responsive to the magnetic field signals generates the output signal which encodes both the pair of angle values and the pair of amplitude values.

9. The circuit of claim 8, further comprising an amplifier having a single input configured to receive the magnetic field sensor output signal and provide an amplified version of the single sensor output signal at an output thereof and wherein the single, amplified output signal is an analog signal.

10. The circuit of claim 8, wherein the circuitry responsive to the magnetic field signals to generate the magnetic field sensor output signal comprises at least one of a filter or an offset adjustment circuit to receive and filter the single, amplified output signal.

11. The circuit of claim 10, wherein an output of the filter or offset adjustment circuit is a filtered analog signal.

12. The circuit of claim 11, wherein the circuitry responsive to the magnetic field signals to generate the magnetic field sensor output signal comprises an analog-to-digital converter to convert the filtered analog signal to a digital signal for computation to generate the magnetic field sensor output signal.

13. The circuit of claim 1 wherein the object is comprised of a magnetic material and wherein the magnetic field is generated by the object.

14. The circuit of claim 1 wherein the object is coupled to a magnet and wherein the magnetic field is generated by the magnet.

15. The circuit of claim 1 wherein the magnetic field is affected by motion of the object.

16. The circuit of claim 1 wherein the pair of angle values are associated with angular positions of the magnetic field with respect to a reference surface of the magnetic sensor, and the pair of amplitude values are associated with amplitudes of the magnetic field with respect to the reference surface.

17. The circuit of claim 1 wherein the magnetic field sensor comprises a memory device configured to store values associated with the pair of angle values and pair of amplitude values of the magnetic field.

18. The circuit of claim 1 wherein the plurality (N) of pairs of angle values comprises two pairs of angle values, and the plurality (M) of pairs of amplitude values comprises two pairs of amplitude values.

19. The circuit of claim 1 wherein the plurality (N) of pairs of angle values comprises eight pairs of angle values and the plurality (M) of pairs of amplitude values comprises two pairs of amplitude values.

20. The circuit of claim 1 wherein the circuit is provided in an automobile headlight assembly and each of the plurality (N) of pairs of angle values corresponds to a respective selection of the headlight assembly.

21. The circuit of claim 20 wherein each of the plurality (M) of pairs of amplitude values corresponds to a respective state of the respective selection of the headlight assembly.

22. The circuit of claim 21 wherein the respective state includes an on state and an off state of the respective selection.

23. The circuit of claim 1 wherein the encoded spatial regions are user or factory encoded spatial regions.

24. A circuit for detecting motion of an object, the circuit comprising:

magnetic field sensing means configured to detect a magnetic field associated with the object and falling within a pair of magnetic field angle values and a pair of magnetic field amplitude values and in response thereto configured to generating an output signal indicative of one of a plurality of encoded spatial regions, each of the encoded spatial regions defined by:

one pair of magnetic field amplitude values selected from a plurality (M) of pairs of amplitude values; and one pair of magnetic field angle values selected from a plurality (N) of pairs of angle values, wherein the plurality (N) of pairs of angle values comprises a first plurality (N) of pairs of angle values corresponding to a first pair of amplitude values representing a first spacing between the magnetic field sensor and the object, and a second plurality (N) of pairs of angle values corresponding to a second pair of amplitude values representing a second spacing between the magnetic field sensor and the object.

25. The circuit of claim 24 wherein the means for generating a signal is a magnetic field sensor and the reference surface is a reference surface of the magnetic field sensor.

26. The circuit of claim 25 wherein the magnetic field sensor comprises at least two magnetic field sensing elements having axes of maximum sensitivity which are orthogonal with respect to each other.

27. A method for detecting, in a magnetic field sensor, motion of an object, the method comprising:

receiving a plurality of magnetic field signals generated in response to detection of a magnetic field associated with the object and falling within a pair of magnetic field angle values and a pair of magnetic field amplitude values which define a respective one of a plurality of encoded spatial regions; and generating an output signal indicative of a respective one of a plurality of encoded spatial regions in response to the received magnetic field signals, each of the encoded spatial regions defined by:

one pair of amplitude values selected from a plurality (M) of pairs of amplitude values; and one pair of angle values selected from a plurality (N) of pairs of angle values, wherein the plurality (N) of pairs of angle values comprises a first plurality (N) of pairs of angle values corresponding to a first pair of amplitude values representing a first spacing between the magnetic field sensor and the object, and a second plurality (N) of pairs of angle values corresponding to a second pair of amplitude values representing a second spacing between the magnetic field sensor and the object.

* * * * *

UNITED STATES PATENT AND TRADEMARK OFFICE
CERTIFICATE OF CORRECTION

PATENT NO. : 10,739,164 B2
APPLICATION NO. : 15/418114
DATED : August 11, 2020
INVENTOR(S) : Bruno Luis Uberti et al.

It is certified that error appears in the above-identified patent and that said Letters Patent is hereby corrected as shown below:

In the Specification

Column 4, Line 15 delete "be an analog" and replace with --be analog--.

Column 4, Line 40 delete "and can be" and replace with --can be--.

Column 6, Line 37 delete "to output" and replace with --to the output--.

Column 6, Line 62 delete "to a trim values" and replace with --to trim values--.

Column 8, Line 16-17 delete "first surface a substrate" and replace with --first surface of a substrate--.

Column 12, Line 2 delete "to indicative a" and replace with --to a--.

Column 14, Line 50-51 delete "indicative may be" and replace with --may be--.

Column 15, Line 25 delete "detection" and replace with --detect--.

In the Claims

Column 17, Line 37 Claim 24 delete "generating" and replace with --generate--.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*